United States Patent
Kuo

(10) Patent No.: US 7,292,601 B2
(45) Date of Patent: Nov. 6, 2007

(54) ERROR-RATE MANAGEMENT IN WIRELESS SYSTEMS

(75) Inventor: Wen-Yi Kuo, Morganville, NJ (US)

(73) Assignee: AT&T Corp., New York, NY (US)

( * ) Notice: Subject to any disclaimer, the term of this patent is extended or adjusted under 35 U.S.C. 154(b) by 1008 days.

(21) Appl. No.: 09/883,346

(22) Filed: Jun. 19, 2001

(65) Prior Publication Data

US 2002/0191564 A1 Dec. 19, 2002

(51) Int. Cl.
*H04J 3/16* (2006.01)
(52) U.S. Cl. ..................................... 370/465
(58) Field of Classification Search ............... 370/229, 370/236, 310, 311, 464, 465, 479; 455/522, 455/67–69; 709/227–233
See application file for complete search history.

(56) References Cited

U.S. PATENT DOCUMENTS

| | | | | | |
|---|---|---|---|---|---|
| 5,386,589 | A | * | 1/1995 | Kanai | 455/423 |
| 5,563,895 | A | * | 10/1996 | Malkamaki et al. | 714/748 |
| 5,745,520 | A | * | 4/1998 | Love et al. | 375/130 |
| 6,084,904 | A | * | 7/2000 | Wang et al. | 375/130 |
| 6,208,620 | B1 | * | 3/2001 | Sen et al. | 370/231 |
| 6,298,242 | B1 | * | 10/2001 | Schiff | 455/522 |
| 6,665,283 | B2 | * | 12/2003 | Harris et al. | 370/333 |
| 6,711,150 | B1 | * | 3/2004 | Vanghi | 370/342 |
| 6,771,700 | B1 | * | 8/2004 | Razoumov et al. | 375/227 |
| 6,898,192 | B2 | * | 5/2005 | Chheda et al. | 370/311 |
| 2002/0167907 | A1 | * | 11/2002 | Sarkar et al. | 370/252 |

* cited by examiner

Primary Examiner—Dmitry Levitan

(57) ABSTRACT

Methods and systems are provided to control transmit power in a wireless transmitter. By receiving a number of transmit control protocol (TCP) segments, converting the TCP segments to radio link control (RLC) frames and transmitting the RLC frames based on a predetermined targeted frame error rate, the initial RLC frames are transmitted using a minimum of power. Any unsuccessfully transmitted RLC frames are cyclically re-transmitted, along with a number of new RLC frames, at decreasing targeted frame error rates, until all RLC frames in a given transmission cycle are successfully transmitted. Accordingly, a new block of RLC frames are transmitted at the predetermined maximum targeted frame error rate. By transmitting RLC frames in this fashion, the overall transmit power can be reduced as compared to conventional transmission techniques, while increasing total data throughput.

17 Claims, 6 Drawing Sheets

ERROR-RATE MANAGEMENT IN WIRELESS SYSTEMS

BACKGROUND OF THE INVENTION

1. Field of Invention

This invention relates to methods and systems for managing a system target frame error rate in wireless transmitters.

2. Description of Related Art

As global telecommunications networks expand, the need to efficiently interface wired networked systems, such as the Internet, to wireless systems increases. However, most existing wired and wireless systems were developed with different design criteria in mind leading to incompatible wired and wireless systems. While various systems are available to interface wired and wireless systems, these systems are imperfect as they generally incorporate a large number of compromises. As a result, information traversing these interface systems can cause excessive delays as they do not efficiently manage available resources. Accordingly, new systems and techniques that can more efficiently interface wired and wireless systems are needed.

SUMMARY OF THE INVENTION

The invention provides methods and systems for optimizing the data transmission rate and power management over a wired to wireless interface using an targeted frame error rate protocol.

In various embodiments, a technique for controlling the frame error rate (FER) and consequently the transmit power of a wireless transmitter is provided by receiving a number of transmit control protocol (TCP) segments, converting the TCP segments to radio link control (RLC) frames and transmitting the RLC frames at a predetermined power level associated with a first targeted FER. If one or more RLC frames are unsuccessfully transmitted, the unsuccessfully transmitted frames are re-transmitted, along with a number of new RLC frames, at a higher power level associated with a second targeted FER.

If any RLC frames in the subsequent transmission cycle are still unsuccessfully transmitted, the unsuccessfully transmitted RLC frames are again re-transmitted at an even higher power level associated with a third targeted FER. The cycle repeats until all RLC frames in a particular transmission cycle are successfully transmitted and a new block of RLC frames are subsequently transmitted at the predetermined first targeted FER.

By transmitting RLC frames in this fashion, the overall transmit power can be reduced as compared to conventional transmission techniques, while increasing total data throughput. Other features and advantage of the present invention are described below are apparent from the accompanying drawings and from the detailed description which follows.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

Figure 1:
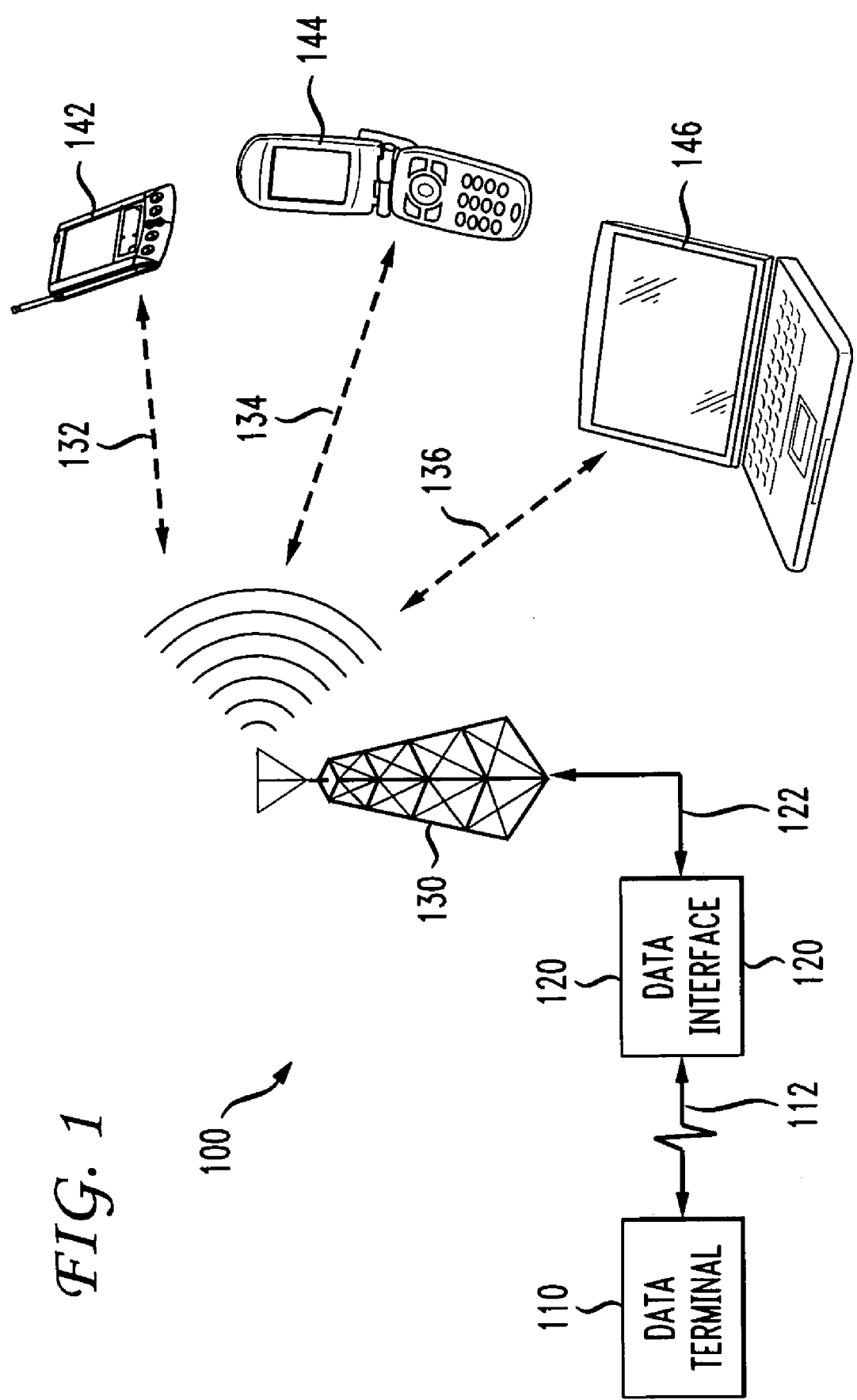
FIG. 1 is a block diagram of an exemplary wired/wireless data network.

As global telecommunications networks expand, the need to efficiently interface wired network systems to wireless systems increases. However, these wired and wireless systems are generally not compatible as they were developed with different design criteria in mind. For example, transmission across a wired network, such as a T1, E1 or 10baseT network, is generally a far more reliable process than transmission across a wireless network such as a CDMA cell. As a result, any data safeguards associated with wireless network can have a negatively synergistic effect with the data throughout of a wired network, thereby causing unnecessary information bottlenecks.

For wired networks, transmission control protocol (TCP) is a predominant network protocol. TCP transmits data across a network by packaging the data into segments of various predetermined sizes. In operation, when a new TCP connection is opened, the size of the first transmitted segment is by default a minimum allowable segment size. As successive TCP segments are successfully transferred from a TCP transmitter to a receiver, the size of the transmitted TCP segments can increase. As the TCP receiver receives each TCP segment, the receiver must determine whether the TCP segment is correctly received, i.e., no bit-errors are present, and acknowledge to the TCP transmitter that the TCP segment was correctly received. If the TCP receiver fails to respond to the TCP transmitter within a prescribed time, a time-out error occurs and the TCP transmitter must retransmit the data within the unacknowledged segment. However, according to TCP protocol, upon a time-out condition, the unacknowledged data must not only be retransmitted, but the TCP segment size again defaults to the minimum size. As a result of the small segment sizes, the overall flow of data across the TCP network will be reduced.

Radio link control (RLC), like TCP, is a predominant data protocol, but is tailored for wireless systems. According to RLC protocol, data can be transmitted from a ground station to a wireless receiver in RLC data frames, which are analogous to TCP data segments. Like TCP segments, if any bit of a particular frame is erroneously received, the erroneous frame must be discarded and the original frame must be retransmitted until the frame is successfully received.

The ratio of erroneously transmitted frames compared to the number of total transmitted frames defines the frame error rate (FER). For wireless systems, the FER is a function of a wireless transmitter's output power. The higher the output power, the lower the expected FER. Unfortunately, wireless transmitters must often operate under a power constraint, and therefore wireless transmitters cannot constantly transmit using their maximum power. As a result, there is a tradeoff between the overall power output of a transmitter and the FER. On the other hand, as transmission power for a particular transmitter is decreased, the interference caused to other transmitters is reduced, thus increasing the success rate for the other transmitters.

Conventional wireless transmitters approached the FER/power tradeoff by deciding an arbitrary acceptable FER rate, and setting the transmit power to a constant level. Unfortunately, the predetermined power level can be inadequate for those wireless receivers that are most susceptible to errors, such as receivers at the perimeter of a wireless cell. In such cases, a single data frame can often be retransmitted a large number of times. Such excessively retransmitted RLC frames can result in long delay times. If the data within such a RLC frame is derived from a TCP segment, the long delay times caused by excessive numbers of re-transmissions can cause a TCP time-out error to occur. As discussed above, a time-out error can cause a TCP transmitter to retransmit the data in the smallest available TCP segment size. As a result of the small TCP segment size, a data bottleneck arises as data is unnecessarily forced to "trickle" across the TCP network in minuscule packets.

However, by determining a maximum acceptable FER and a respective minimum power level expected to achieve the maximum acceptable FER, a majority of RLC frames can be transmitted using this minimal power level. The minimum power level can continually be used until one or more RLC frames are not successfully transmitted. Those RLC frames not successfully transmitted at the initial power level or any other power level can be repeatedly retransmitted at incrementally higher power levels associated with successively lower FERs until all RLC frames in a particular transmission cycle are successfully received. Upon successful transmission of all RCL frames, the next transmission cycle can transmit a new set RLC frames based on the maximum acceptable FER, and so on. By adaptively varying the FER and respective power in this fashion, power consumption can be minimized while avoiding TCP time-outs.

FIG. 1 is a block diagram of an exemplary transmission system 100 capable of interfacing a TCP-based wired network and a CDMA wireless network. The transmission system 100 includes a data interface 120 connected to a data terminal 110 through a first link 112 and to a data transmitter/receiver 130 through a second link 122. The data transmitter/receiver 130 is further coupled to a number of wireless devices, such as including a personal digital assistant (PDA) 142 via path 132, a cellular phone 144 via path 134 and a portable computer 146 via path 136, for example.

In operation, the data interface 120 provides a communication path between the data terminal 110 and the various wireless devices 142-146 using the data transmitter/receiver 130. The data terminal 110 transmits data to, and receives data from, the data interface 120 over link 112. As data is transmitted from the data terminal 110 to the various wireless devices 142-146, the data interface 120 converts the data from a TCP segments to an RLC frames, assigns an expected, or targeted, frame error rate and determines a power level for the RLC frames to be transmitted based on the targeted frame error rate. The RLC frames are then passed to the data transmitter/receiver 130 along with the power transmission instructions.

The data transmitter/receiver 130 receives the RLC frames and power instructions and transmits the RLC frames to the various wireless devices 142-146 using a power level commensurate with the received power instructions.

As the RLC frames are received by the various wireless devices 142-146, the wireless devices 142-146 make determinations as to whether individual RLC frames directed to each of the various wireless devices 142, 144 or 146 were successfully received, i.e., without any bit-errors. The wireless devices 142-146 can then send an acknowledgment message to the data transmitter/receiver 130 indicating successful or unsuccessful receipt of each RLC data frame.

The data transmitter/receiver 130 receives the acknowledgment messages and forwards the acknowledgment messages to the data interface 120. The data interface 120, in turn, determines whether all of the data in each TCP segment has been successfully transmitted to an intended wireless device 142-146 and generates a TCP acknowledgment message to the data terminal 110 indicating that the respective data for each successfully transferred TCP segment was successfully received.

The data terminal 110 of the exemplary system 100 can be a personal computer executing Transmission Control Protocol (TCP) operating over Internet Protocol (IP), commonly referred to together as TCP/IP. However, the data terminal 110 can also be any one of a number of different types of data sources, such as a computer, a storage device, or any combination of software or hardware capable of generating, relaying, or recalling from storage data capable of being transmitted, directly or indirectly, to a transmission network, or medium, using a network protocol.

The data interface 120 of the exemplary system 100 can be a personal computer receiving data using a cable, a digital subscriber line (xDSL) modem and TCP/IP protocol. However, the data interface 120 can also be any device capable of transmitting/receiving data according to any predetermined network protocol, such as a computer, a storage device, or any combination of software and hardware capable of receiving, relaying, storing, or sensing data without departing from the spirit and scope of the present invention.

The first data link 112 of the exemplary embodiment can be a link on the Internet. However, the first data link 112 can also be a link on a wide area network or a local area network, an intranet, any subset of the Internet, or a link on any distributed processing network or system. In general, the first data link 112 can be any known or later developed transmission medium, computer program, or structure usable to transmit data from the data terminal 110 to the data interface 120.

The second link 122, like the first data link, can be any known or later developed device or system for connecting the data interface 120 to the data transmitter/receiver 130. Such devices include direct serial/parallel cable connections, wireless connections, satellite links, connections over a wide area network or a local area network, connections over an intranet, connections over the Internet, or connections over any other distributed processing network or system. Additionally, the second link 122 can be software devices linking various software systems. In general, the second link 122 can be any known or later developed connection system, computer program, or structure usable to connect the data interface 120 to the transmission network 120.

As discussed above, data terminal 110 and the data interface 120 transfer data according to TCP. Accordingly, data segments transferred by the data terminal 110 and/or received by the data interface 120 can be of various predetermined sizes according to the TCP protocol requirements. However, it should be appreciated that because protocols change over time and new protocols can emerge, the data terminal 110 and data interface 120 can transmit/receive data according to any protocol having a set of predetermined packet sizes without departing from the spirit and scope of the present invention.

The exemplary data transmitter/receiver 130 is a wireless transmitter transmitting/receiving radio signals according to a CDMA protocol. However, the data transmitter/receiver 130 can be any one of a number of different data sources/sinks such as a wireless transmitter/receiver, a transmission/reception system employing wires such as a twisted wire pair, a transmitter/receiver adapted for transmitting across coaxial cable, an optical transmitter/receiver, a fiber-optic transmitter/receiver, a sonic transmitter/receiver or any other known or later developed device suitable for transmitting/receiving data. Accordingly, the wireless devices 142-146 can be any number of devices compatible with the data transmitter/receiver 130 including specially adapted computer-based systems, cellular phones, PDAs and the like.

Figure 2:
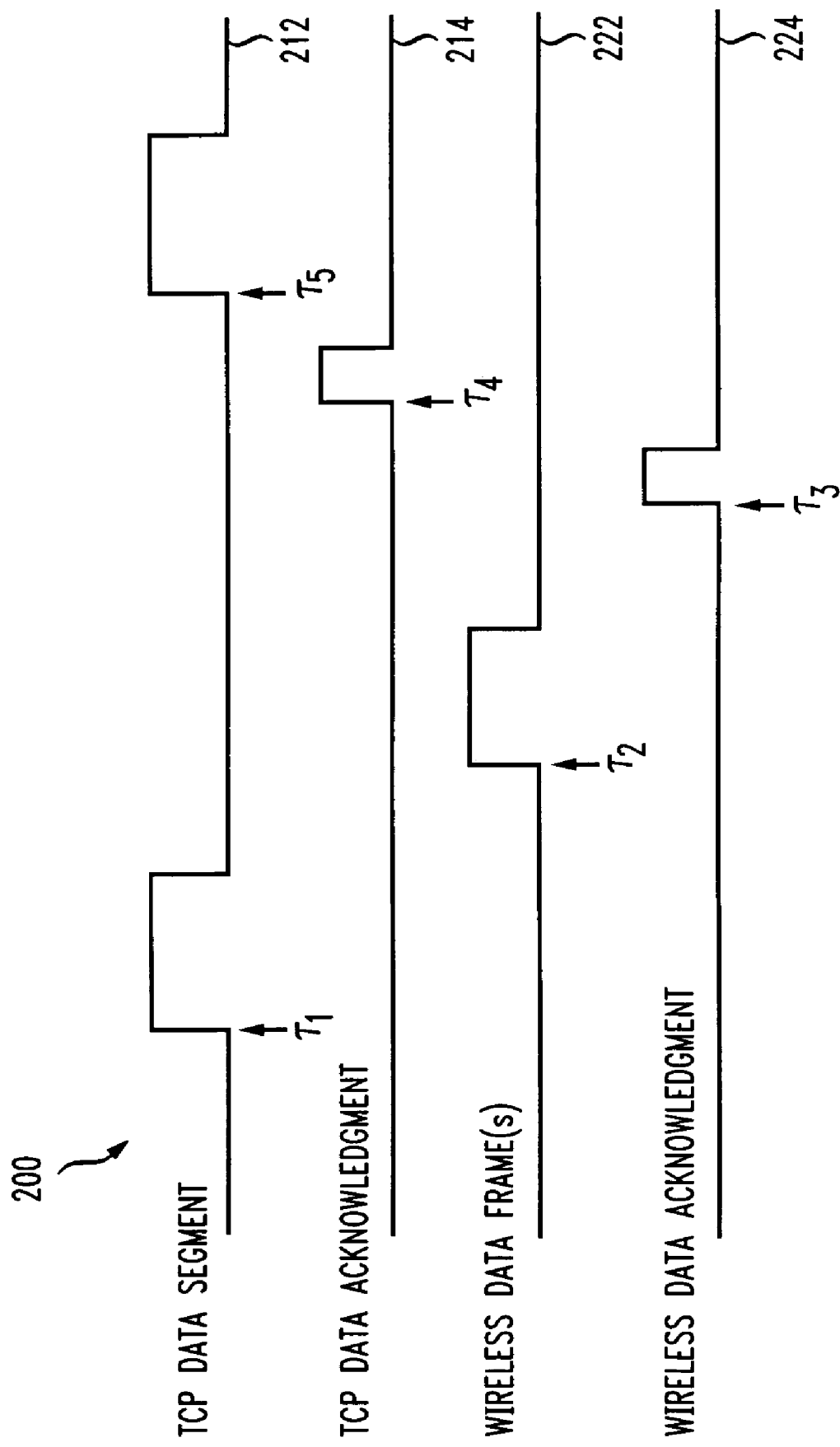
FIG. 2 depicts the flow of traffic as data is transferred from a wired system to a wireless system.

FIG. 2 is a timing diagram depicting the flow of traffic as data is transferred from the date terminal 110 of FIG. 1 to one of the various wireless devices 142-146. As shown in FIG. 2 timing can be expressed using four signals: a TCP data segment signal 212, a TCP data acknowledgment signal 222, a wireless data frame 214 and a wireless data acknowledgement signal 224.

In normal operation, a first TCP data segment is sent by the data terminal 110 to the data interface 120 at time $\tau_1$. The data interface 120 reformats the data contained in the TCP segment into one or more RLC frames and transmits the RLC frames to one or more wireless devices 142-146 using the data transmitter/receiver 130 at time $\tau_2$. Upon successful receipt of the RLC frames by one of wireless device 142, 144 or 146, the wireless device 142, 144 or 146 sends an acknowledgment back to the data interface via the data transmitter/receiver 130 at time $\tau_3$. Accordingly, the data interface 120 sends a TCP acknowledgment to the data terminal 110 at time $\tau_4$. Once the data terminal 110 receives the TCP acknowledgment, the data terminal 110 can repeat the cycle by transmitting another TCP segment to the data interface 120 at $\tau_5$. As FIG. 2 demonstrates, transferring data from a TCP network to a wireless network data transfer cycle can require the successful transmission, reception and acknowledgment of every RLC frame containing data from a particular TCP segment before a TCP acknowledgment can be generated.

Figure 3:
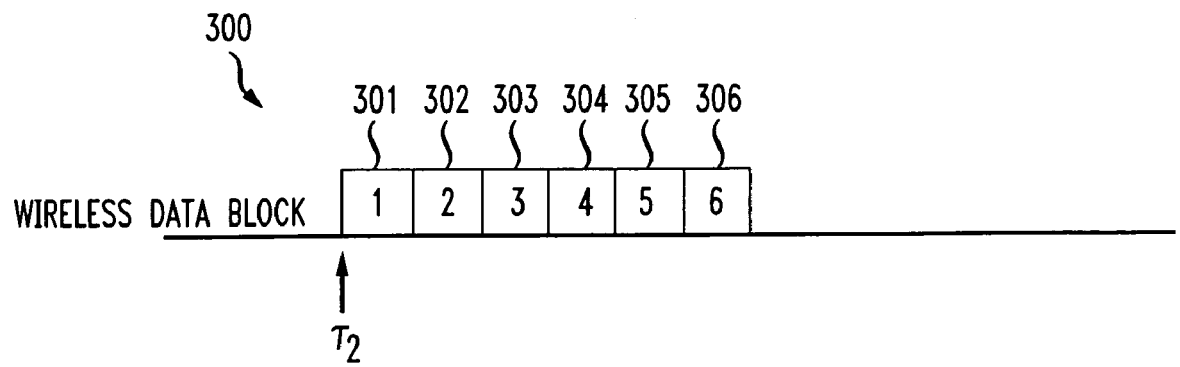
FIG. 3 depicts a block of frames transmitted in a wireless system according to a radio link control protocol.

FIG. 3 depicts the block of frames 300 transmitted in a wireless system according to an RLC protocol. As shown in FIG. 3, a given wireless transmission can include a number of separate and independent frames 301-306. While the exemplary block of frames 300 contains six frames 301-306, it should be appreciated that the number of frames can vary as a design choice or derived according to the design requirements of various systems without departing from the spirit and scope of the present invention.

The individual frames 301-306 can contain information from a single TCP segment and be destined for a single wireless receiver, or each frame 301-306 can contain data from different TCP segments and be destined for different wireless receivers. For a given transmission cycle, each frame 301-306, whether destined to the same or different devices, can be successfully or unsuccessfully received. Accordingly, for a given block of frames, if a fraction of the frames are unsuccessfully transmitted, the unsuccessfully transmitted frames can be retransmitted while data from other TCP segments can be used to generate new RLC frames fill in the remaining frame slots. For example, for the exemplary block of frames 300 ($f_1$, $f_2$, $f_3$, $f_4$, $f_5$, $f_6$), if a first transmission successfully transfers all but the first and last frames ($f_1$, $f_6$), ($f_1$, $f_6$) can be retransmitted along with four new frames that form a second block of frames ($f_1$, $f_6$, $f_7$, $f_8$, $f_9$, $f_{10}$). Any unsuccessfully transmitted frames in the second block can be held over to a third block, and so on. As discussed above, the frame error rate for the various frames can be a function of the transmit power, and the likelihood that each frame 301-306 will be successfully transmitted will increase with increasing transmit power. Accordingly, it should be appreciated that, for a previously unsuccessfully transmitted frames, the likelihood that the frame will be transmitted in a second transmission can appreciably increase if the transmit power is increased.

Figure 4:
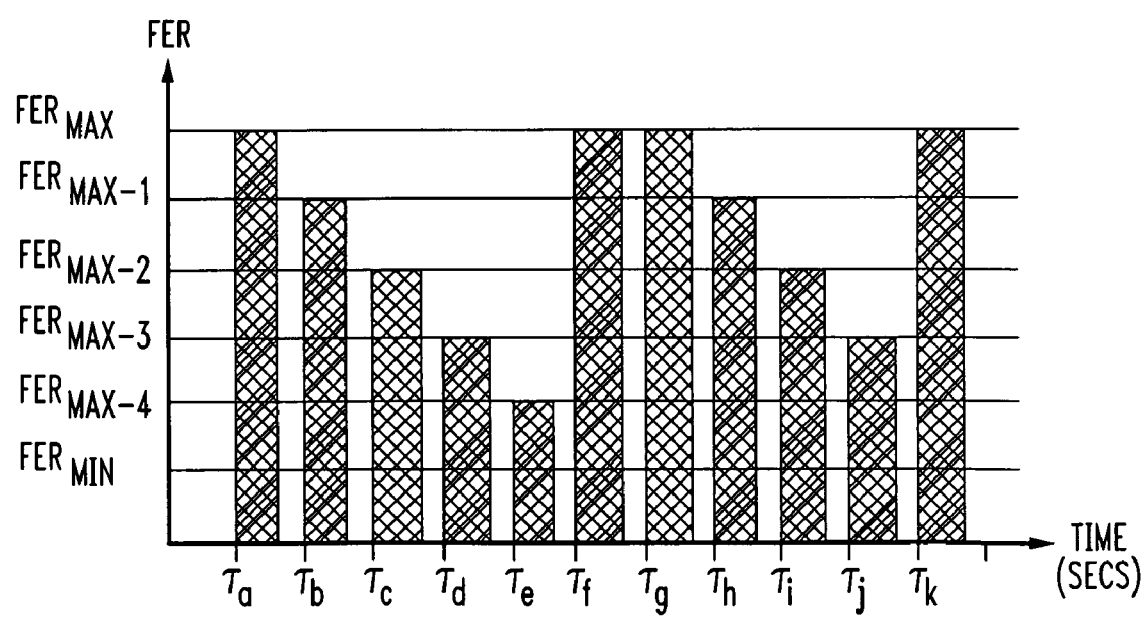
FIG. 4 depicts an exemplary histogram of a frame error rate management approach in a wireless system based on targeting frame error rates.

FIG. 4 depicts an exemplary histogram of a frame error rate management approach in a wireless system. As shown in FIG. 4, a first wireless transmission at time $\tau_a$ occurs using a default maximum targeted frame error rate $FER_{MAX}$. Generally, $FER_{MAX}$ will correlate to a first power level $P_{min}$. That is, for a given set of conditions, there will be a transmission power level $P_{min}$ that is expected to produce a frame error rate of $FER_{MAX}$. For example, given a targeted frame error rate of ten frames per hundred, an exemplary transmitter transmitting blocks of frames may require one-thousand (1,000) watts. However, the same transmitter transmitting blocks of frames for a targeted frame error rate of seven frames per hundred may require two-thousand (2,000) watts. Still further, the same transmitter transmitting blocks of frames for a targeted frame error rate of one frame per hundred may require ten-thousand (10,000) watts, and so on.

Generally, $FER_{MAX}$, as well as any other targeted frame error rate, can be set before transmission starts. For example, in various exemplary embodiments $FER_{MAX}$ can be estimated based on a set of environmental conditions such that a TCP time-out can be expected to occur every two minutes, $FER_{MAX-1}$ can be estimated to produce a TCP time-out every ten minutes, and so on. In other embodiments, the various frame error rates can be estimated using a simulation based on link level curves (e.g. FER vs power) to predict a set of FERs that can yield the best system throughput or best power efficiency. However, it should be appreciated that any scheme that can generate a set of target frame error rates can be used without departing from the spirit and scope of the present invention. After $FER_{MAX}$ is estimated, $P_{min}$ can be determined such that a number of frames transmitted at $P_{min}$ can be expected to produce a frame error rate of $FER_{MAX}$. However, it should be appreciated that $P_{min}$ can also be an adaptive quality that changes over time in response to various operational factors. For example, a particular transmitter can vary $P_{min}$ if a targeted FER differs from the actual frame error rate, or $P_{min}$ can automatically vary as a function of various environmental conditions such as measured or estimated background noise. Furthermore, it should be appreciated that $P_{min}$ can vary with other operational changes such as transmission protocol, e.g., varying bit-rates, changes in modulation schemes, and the like.

Returning to FIG. 4, assuming one or more of the frames transmitted at time $\tau_a$ are unsuccessfully received, the unsuccessfully transmitted frames can be re-transmitted at time $\tau_b$ using an incrementally smaller targeted frame error rate $FER_{MAX-1}$. The new targeted frame error rate $FER_{MAX-1}$ can require a commensurately larger power level ($P_{min+1}$) db, which will intuitively provide a lower expected frame error rate by virtue of its higher power. Assuming one or more of the frames transmitted at time $\tau_b$ are still unsuccessfully received, the unsuccessfully transmitted frames can again be re-transmitted at time $\tau_c$ using an incrementally smaller targeted frame error rate $FER_{MAX-2}$ and its respective power level ($P_{min+2}$) db, which will again provide an even lower expected frame error rate by virtue of its much higher power. As further demonstrated by FIG. 4, any unsuccessfully transmitted frames can still further be re-transmitted at increasingly lower targeted FERs until, at time $\tau_e$, all frames in a given transmission are successfully transmitted.

FIG. 4, demonstrates that, in various exemplary embodiments, if all of the transmitted frames in a block of frames are successfully received for a given transmit cycle, the successive transmit cycle can transmit a next block of frames at the maximum targeted frame error rate. For example, assuming that all frames are successfully transmitted at times $\tau_e$, $\tau_f$ and $\tau_j$, the targeted FER for the next transmit cycle, $\tau_f$, $\tau_g$ and $\tau_k$, respectively, will be at the predetermined maximum targeted $FER_{MAX}$. Alternatively, if any of the transmitted frames in a block of frames are not successfully received for a given transmit cycle, the successive transmit cycle can transmit the next block of frames at an incrementally lower targeted frame error rates.

However, in various other exemplary embodiments, it should be appreciated that, if any of the transmitted frames in a block of frames are not successfully received for a given transmit cycle, the successive transmit cycle can transmit the next block of frames at a frame error rate that varies a function of the number of unsuccessful frames. For example, if one of six frames in a block of frames is unsuccessfully received, the targeted frame error rate for next transmit cycle can decrease incrementally. However, if a comparatively larger number of frames, e.g., five of six, are unsuccessfully received, the target frame error rate for next transmit cycle can decrease by several increments or even be transmitted at a predetermined minimum frame error rate $FER_{MIN}$.

In still various other exemplary embodiments, it should be appreciated that the targeted frame error rates for a given transmission can be a function of the maximum number of re-transmissions of a single frame and/or the total number of unsuccessfully transmitted frames. In still other exemplary embodiments, it should be appreciated that the targeted frame error rates level can vary as a function of the total number of bit errors, as opposed to frame errors, as well as erroneous bytes, erroneous octets, distributions of errors, and the like without departing from the spirit and scope of the present invention.

Figure 5:
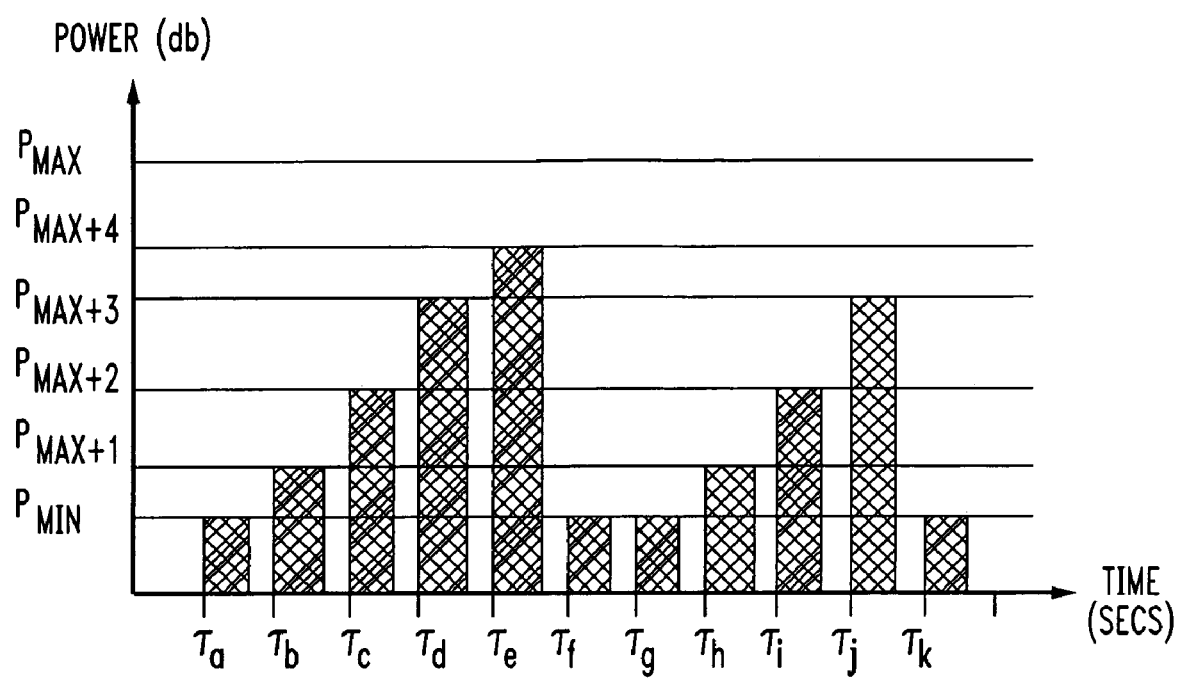
FIG. 5 depicts an exemplary power histogram based on the targeted frame error rates of FIG. 4.

FIG. 5 depicts an exemplary histogram of the power levels associated with the targeted frame error rate histogram of FIG. 4. As shown in FIG. 5, the first wireless transmission at time $\tau_a$ uses an exemplary minimum power level $P_{min}$ associated with $FER_{MAX}$, and further shows various other power levels $P_{min+1}$, $P_{min+2}$, $P_{min+3}$, ... associated with $FER_{MAX-1}$, $FER_{MAX-2}$, $FER_{MAX-3}$, ..., respectively, for each transmission cycle time $\tau_a$, $\tau_b$, $\tau_c$, ... $\tau_k$. As discussed above, the particular power levels associated with each targeted frame error rate can vary according to a number of conditions such as environmental conditions, operational factors such as changing bit-rates, non-operational considerations, and the like.

Figure 6:
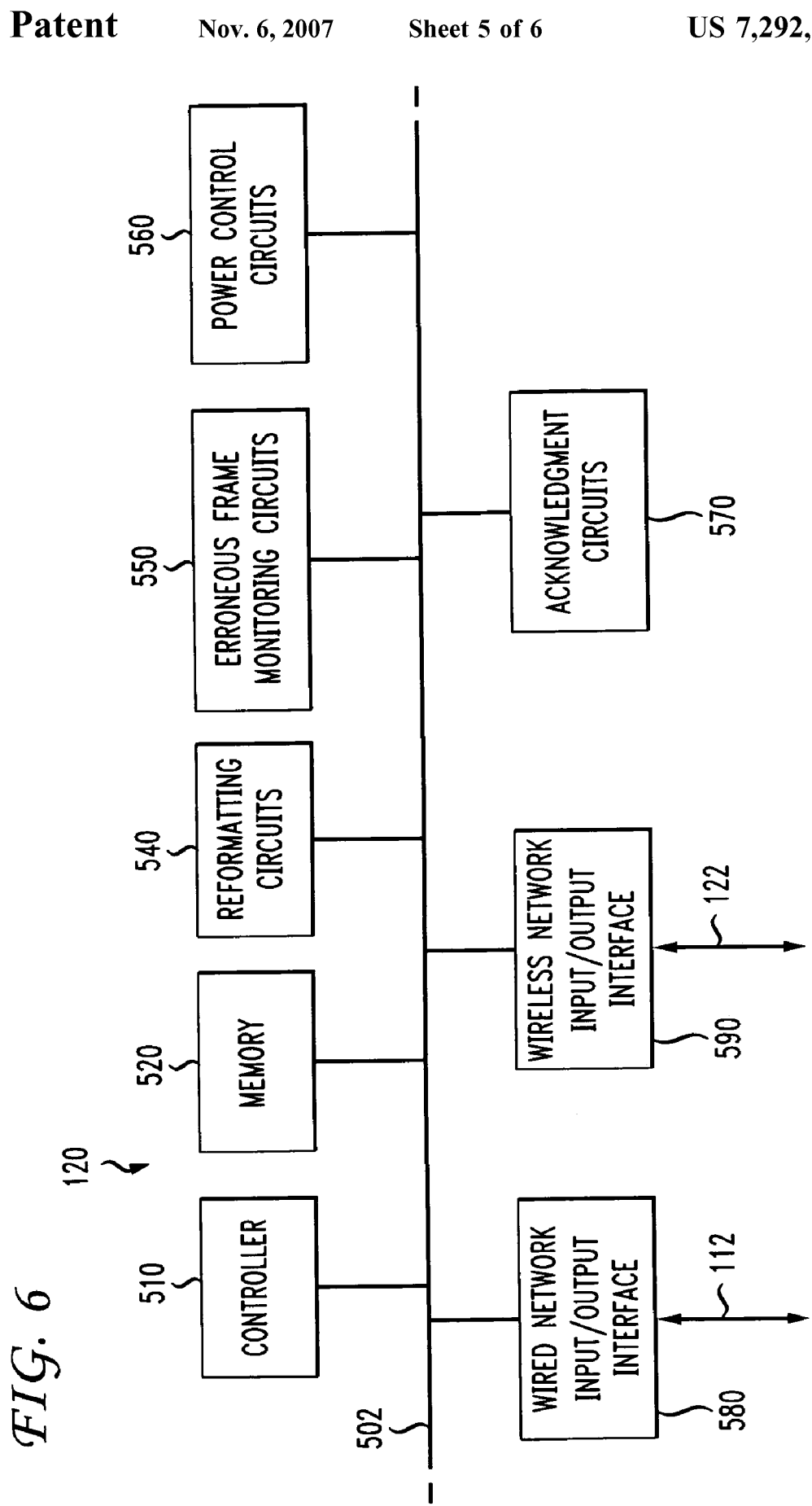
FIG. 6 is a block diagram of the data interface of FIG. 1.

FIG. 6 is a block diagram of the data interface 120 of FIG. 1. The data interface 120 includes a controller 510, a memory 520, reformatting circuits 540, erroneous frame monitoring circuits 550, power control circuits 560, acknowledgment circuits 570, a wired network input/output interface 580 and a wireless network input/output interface 590. The above components are coupled together by control/data bus 502. Although the exemplary data interface 120 uses a bussed architecture, it should be appreciated that any other architecture may be used as is well known to those of ordinary skill in the art.

In operation, and under control of the controller 510, the wired network input/output interface 580 receives a number of TCP segments via link 112, and stores the TCP segments in the memory 520. Next, the controller 510 transfers the TCP segments to the reformatting circuits 540, where the reformatting circuits 540 reformats and repackages the data within the TCP segments into a number of RLC frames. The reformatting circuits 540 can further organize the various RLC frames into a block of frames suitable for transmission, and provide the block of RLC frames to a transmitting device (not shown) using the wireless network input/output interface 590 and link 122.

Concurrently, the power control circuits 560 can likewise provide the desired power level based on a targeted frame error rate to the transmitter. Because none of the RLC frames have been previously transmitted, the erroneous frame monitoring circuits 550 will initially generate an error value of zero, which it provides to the power control circuits 560. The power control circuits 560 can accordingly receives the error value and generates a targeted frame error rate and respective transmit power command based on the error value, which will initially be a predetermined maximum frame error rate minimum power level.

As discussed above, for each RLC frame that is successfully received, an RLC acknowledgment signal indicating successful reception should be returned. In such cases, under control of the controller 5 10, the acknowledgment circuits 570 will receive these successful RLC acknowledgment signals via the wireless network input/output interface 590. As the acknowledgment circuits 570 receive the successful RLC acknowledgment signals, the acknowledgment circuits 570 compare the successfully received RLC frames against the respective TCP segments stored in the memory 520. If all of the data incorporated in a particular TCP frame is successfully received and acknowledged, the acknowledgment circuits 570 generate a TCP acknowledgment signal indicating successful reception, and provide the TCP acknowledgment signal to the sender of the TCP segment via the wired network input/output interface 580.

However, if one or more of the RLC acknowledgment signals are returned indicating an unsuccessful, i.e. erroneous, reception, the erroneous frame monitoring circuits 550, under control of the controller 510, will receive these unsuccessful acknowledgments and increment its internal counter. Likewise, if no acknowledgment signal for a particular frame is received at all, controller 510 can assume that that frame was unsuccessfully received and command the erroneous frame monitoring circuits 550 to increment its counter. On the other hand, if all of the frames in the last transmission cycle are successfully received and acknowledged, the erroneous frame monitoring circuits 550 will reset its counter to zero.

After determining the new error value, the erroneous frame monitoring circuits 550 can provide the new error value to the power control circuits 560. The power control circuits 560, in turn, can generate a new targeted frame error rate based on the received error value, generate a respective transmit power level based on the new targeted frame error rate, and provide the new transmit power level to the transmitter. As discussed above, in various exemplary embodiments, the targeted frame error rate can increase in fixed increments of the error value, or in other various exemplary embodiments, the targeted frame error rate can increase as a more complex function of the number of erroneous frames, the number of bit errors, byte errors, octet error, and the like, without departing from the spirit and scope of the invention. In still other exemplary embodiments, as discussed above, the respective power level for each targeted frame error rate can vary as a fraction of various conditions such as background noise, environmental conditions and the like without departing from the spirit and scope of the present invention.

Concurrently, for the next transmit cycle, the controller 510 and reformatting circuits 530 can receive more TCP segments and derive more RLC frames, or other RLC frames already converted and stored by the reformatting circuits 540 can be used to fill out a next block of frames along with any remaining frames that were not successfully received and/or acknowledged in the last transmission cycle. As with the previous cycle, the new block of frames, along with the new targeted frame error rate and respective power level, will be provided to the transmitter and the transmit cycle can repeat as required.

It should be appreciated that, in certain circumstances such as a faulty receiver or if a receiver moves beyond the range of a transmitter, increasing the transmit power level of the transmitter will not assure successful reception. Accordingly, various frames can be transmitted at a maximum power level. In such cases, the controller 510 can optionally issue a TCP error message to the sender of a respective TCP segment after a single maximum power transmission and the problematic frames flushed from the frame block. Alternatively, the controller 510 can issue a TCP error message and flush the problematic frames after any number of rebroadcast, as required by design.

Figure 7:
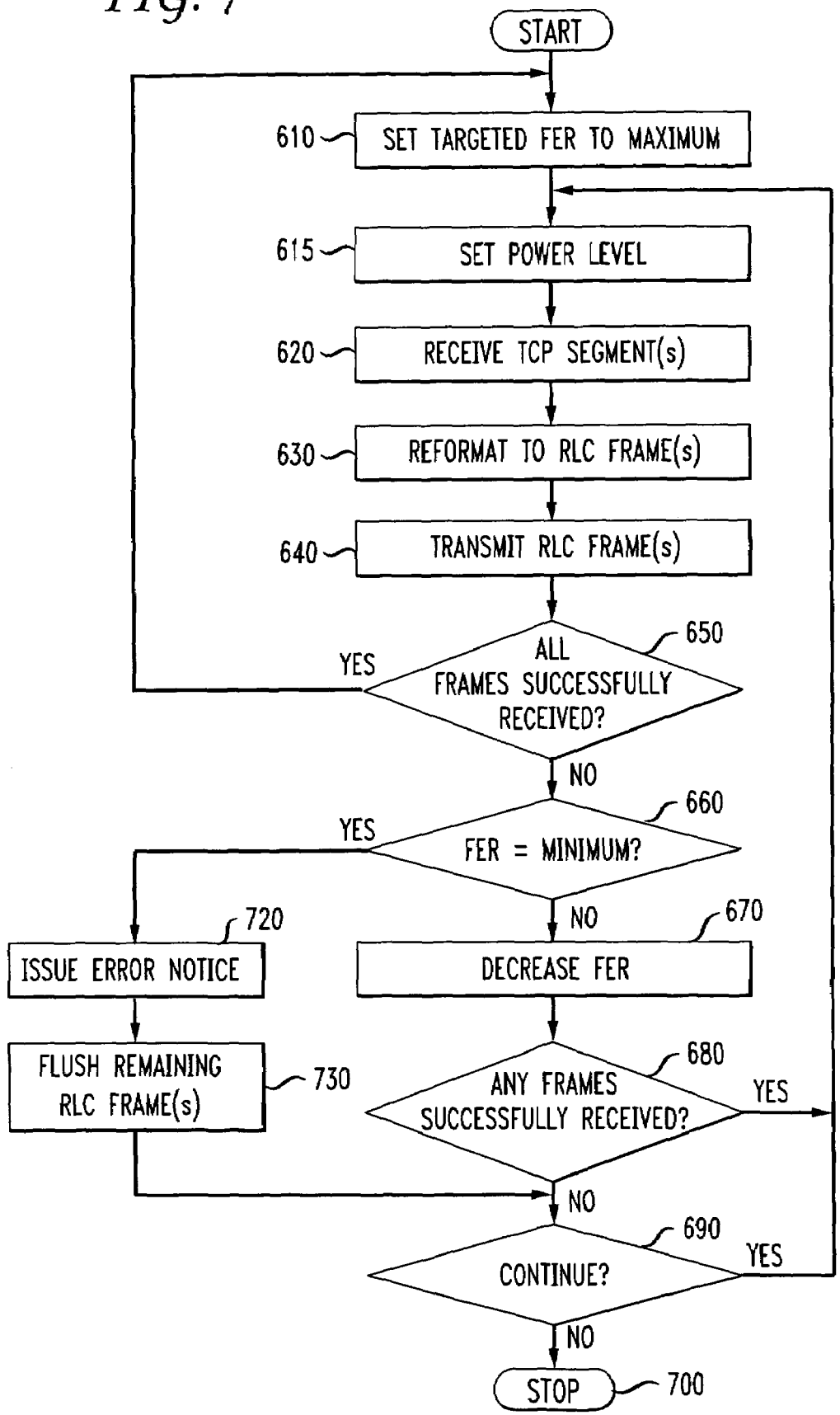
FIGS. 7 is a flowchart outlining an exemplary technique for managing power in a wireless system.

FIG. 7 depicts a flowchart outlining an exemplary method for adaptively transmitting information using a set of targeted frame error rates and respective transmit power levels for a wireless transmitter. The process starts at step 610 where a maximum targeted frame error rate is set for a wireless transmitter. Then, in step 615, a power level is determined that is expected to cause frames to be successfully transmitted at the targeted frame error rate. Next, in step 620, a number of TCP segments is received from a wired network. As discussed above, while the exemplary method uses a TCP network protocol, it should be appreciated that any protocol now known or later developed that transfers data in packets such as TCP segments can be used without departing from the spirit and scope of the present invention. The process continues to step 630.

In step 630, the data incorporated in the received TCP segments is reformatted according to the RLC protocol, including packaging the data in RLC frames. While the exemplary technique uses RLC protocol, it should be appreciated that any known or later developed protocol suitable for transmission across a wireless system can be used without departing from the spirit and scope of the present invention. Control continues to step 640.

In step 640, the RLC frames packaged in step 630 are transmitted according to a CDMA protocol. While the exemplary technique uses a CDMA protocol, it should be appreciated that other protocols such as TDMA, OFMA or any other known or later developed protocol can be used without departing from the spirit and scope of the present invention. It should further be appreciated that, while the exemplary technique transmits frames using a radio frequency transmission system, any other known or later developed wired or wireless transmission system can be used such as various radio frequency systems, microwave-based systems, optical systems, sonic systems, and the like, without departing from the spirit and scope of the present invention. Control continues to step 650.

In step 650, a determination is made as to whether all of the frames transmitted in step 640 were successfully received. If all frames were successfully received, control jumps back to step 610, where the targeted frame error rate is set to its predetermined maximum and a next group of TCP frames are received; otherwise, control continues to step 660. While the exemplary technique defines an unsuccessfully received frame as 20 any frame containing at least one bit error according to a CRC check, it should be appreciated that a determination of success can be made according to any known or later developed error condition such as uncorrected bit errors, a minimum number of bit errors, byte errors, octet errors, and the like. Furthermore, while the exemplary technique does not employ error correction, any technique that can employ any known or later developed error correction technique such as convolutional error detectionlcorrection, block detection/correction and the like can be used without departing from the spirit and scope of the present invention. Control continues to step 660.

In step 660, a determination is made as to whether the last block of RLC frames transmitted in step 640 were transmitted using a minimum targeted frame error rate. If the last frames were transmitted using the minimum targeted frame error rate, control jumps to step 720; otherwise, control continues to step 670.

In step 670 the targeted frame error rate is incrementally decreased according to a predetermined scheme. Next, in step 680, a determination is made as to whether any of the frames transmitted in step 640 were successfully received. If at least one frame was successfully received, control jumps back to step 615 where power is adjusted according to the FEP specified in step 670. and control is then transferred to step 620 where one or more TCP segments are received; otherwise, control continues to step 690.

In step 720, because the last block of frames were transmitted using the minimum allowed targeted frame error rate, an error notice is issued. Then, in step 730, the remaining RLC frames that were unsuccessfully received are flushed from the block of frames, and control continues to step 690. While the exemplary process issues an error notice and flushes the unsuccessfully received frames after a single unsuccessful transmission using the minimum allowed targeted frame error rate, it should be appreciated that any number of such transmissions can be made before making an error determination and flushing the remaining frames.

In step 690, a determination is made whether to continue transmitting CDMA frames. If more CDMA frames are to be transmitted, control jumps back to step 620; otherwise, control continues to step 700, where the process stops.

As shown in FIG. 6, the methods of this invention are preferably implemented using a general purpose computer such as a personal computer with peripheral integrated circuit elements and dedicated communication hardware. However, the data interface 120 can be implemented using any combination of one or more programmed special purpose computers, programmed microprocessors or microcontrollers and peripheral integrated circuit elements, ASIC or other integrated circuits, digital signal processors, hard-wired electronic or logic circuits such as discrete element circuits, programmable logic devices such as a PLD, PLA, FPGA or PAL, or the like. In general, any device capable of implementing a finite state machine that is in turn capable of implementing the flowchart shown in FIG. 7 can be used to implement the data interface 120.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Thus, there are changes that may be made without departing from the spirit and scope of the invention.

What is claimed is:

1. A method for transmitting incoming signal frames, in blocks having a fixed number of frames, comprising:
   (1) generating a frames-block i that includes k of said incoming signal frames, where i is an integer index;
   (2) transmitting frames-block i with a first power level;
   (3) determining whether said step of transmitting failed to correctly transmit j signal frames of said frames-block i, where $j \geq 1$
   (4) when said step of determining concludes in the affirmative,
      (a) generating frames-block i+1 that includes said j frames of said block i that were not transmitted correctly, and k-j subsequent signal frames of said incoming signal frames that had not been included in said frames-block i;
      (b) transmitting frames-block i+1 with a power level that is higher than the power level employed in the immediately previous step of transmitting, wherein frames-block i+1 contains at least those of said frames-block i that failed to be transmitted correctly; and
      (c) incrementing i and returning to step (3).

2. The, method of claim 1, further comprising the step of:
   (5) when said step of determining concludes that said step of transmitting succeeded to transmit said block i correctly,
      (a) resetting the power level to said first power level;
      (b) incrementing i; and
      (c) returning to step (1).

3. The method of claim 2, wherein the first power level corresponds to a preselected first targeted frame error rate.

4. The method of claim 3, wherein each successively higher power level corresponds to a successively lower targeted frame error rate.

5. The method of claim 1, wherein said incoming signal frames are generated from data extracted from signal segments received from a network.

6. The method of claim 5, further comprising a step of generating an acknowledgment signal corresponding to each of one the received segments.

7. The method of claim 6, wherein the segments are transmission control protocol (TCP) segments.

8. The method of claim 5, wherein the frames are radio link control (RLC) frames.

9. The method of claim 1 where each frames-block i, regardless of the value of i has k frames.

10. The method of claim 1 where the first power level is chosen to yield a preselected maximum accepted frame error rate (FER).

11. The method of claim 1 where each power level in step (4)(b) corresponds to a selected target frame error rate.

12. A method for controlling error rates, comprising:
    transmitting a first block of k first frames where k is greater than one at a first power level to target a first frame error rate;
    determining whether one or more first error conditions occurred; and
    if at least one first error condition occurred, transmitting a second block of k frames of second frames at a second power level to target a second frame error rate, wherein the second block contains at least one first frame associated with the one or more first error conditions, and at least one frame that was not included in said transmitting a first block.

13. The method of claim 12, further comprising:
    determining whether one or more second error conditions occurred;
    if at least one second error condition occurred, transmitting a third block of third frames at a third power level to target a second frame error rate, wherein the third block contains at least One second frame associated with the one or more second error conditions; and
    if no second error condition occurred, transmitting a third block of third frames the first power level.

14. An apparatus that transmits frames, comprising:
    a wireless transmitter that transmits frame blocks having a fixed number of frames, the transmitter's power being controllable to substantially transmit frames according to a set of targeted frame error rates;
    a monitor that determines an error condition arises from an immediately past transmission of a block of frames, and sets the transmitter's power to a first power level if no error is determined to have arisen from said immediately past transmission, and to a second power level if it is determined that an error has arisen from said immediately past transmission, where said first power level is based on a first targeted frame error rate of the set of targeted frame error rates, and the second power level is based on a second targeted frame error rate of the set of targeted frame error rates; and
    a reformatting circuit that generates frames from received segment signals for wireless transmission, that forms said blocks of said frames from received segments and from segments that were transmitted earlier, but unsuccessfully.

15. The apparatus of claim 14, further comprising an acknowledgment circuit that generates acknowledgment signals corresponding to the received segments.

16. The apparatus of claim 15, wherein the received segments are transmission control protocol (TCP) segments.

17. The apparatus of claim 14, wherein the second targeted frame error rate is less than the first targeted frame error rate.

* * * * *